(No Model.)　　　　　J. L. SYMONDS.　　　2 Sheets—Sheet 1.
RAT TRAP.

No. 293,683.　　　　　　　　Patented Feb. 19, 1884.

Witnesses:
F. M. Burnham
Wm. H. Bates

Inventor:
John L. Symonds.
by S. A. Kane
Atty

N. PETERS, Photo-Lithographer, Washington, D. C.

(No Model.) 2 Sheets—Sheet 2.

J. L. SYMONDS.
RAT TRAP.

No. 293,683. Patented Feb. 19, 1884.

UNITED STATES PATENT OFFICE.

JOHN L. SYMONDS, OF DETROIT, MICHIGAN.

RAT-TRAP.

SPECIFICATION forming part of Letters Patent No. 293,683, dated February 19, 1884.

Application filed September 1, 1883. (No model.)

*To all whom it may concern:*

Be it known that I, JOHN L. SYMONDS, a citizen of the United States, residing at Detroit, in the county of Wayne and State of Michigan, have invented certain new and useful Improvements in Rat-Traps; and I do hereby declare the following to be a full, clear, and exact description of the invention, such as will enable others skilled in the art to which it appertains to make and use the same.

This invention relates to that class of animal-traps composed entirely of wire, and provided with a spring-operated striking-arm released by the animal pulling upon a baited hook. It seems now to be a well-known fact that with the wire-cage traps, where the animal is caught alive and confined therein, in a very short time after a few rats have been caged, the cage becomes pervaded with the odor of the animal and acts as a caution to the other rats to avoid the cage, thereby destroying the further utility of the cage.

The objects of my invention are to obviate this objection, and to construct a peculiarly-shaped open trap without a bottom, to catch the animals and kill them instantly by a spring-operated striking-arm.

Another object is to manufacture a simple and cheap trap for the trade.

Figure 1:
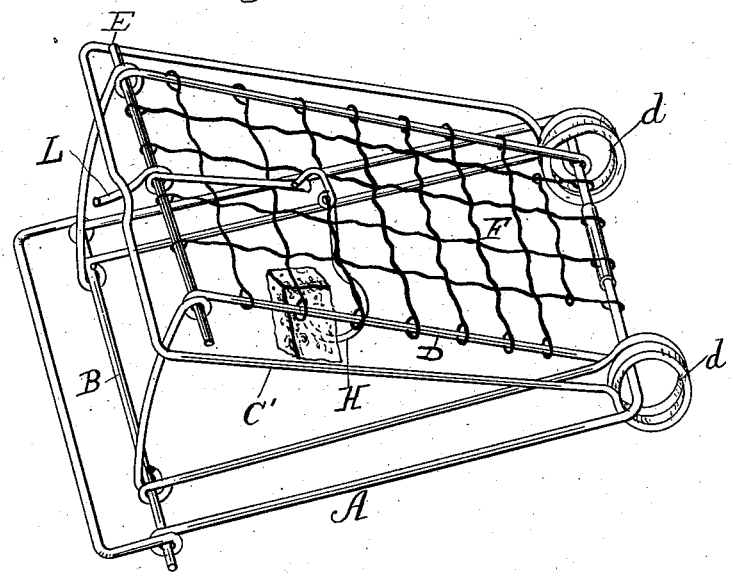
Figure 2:
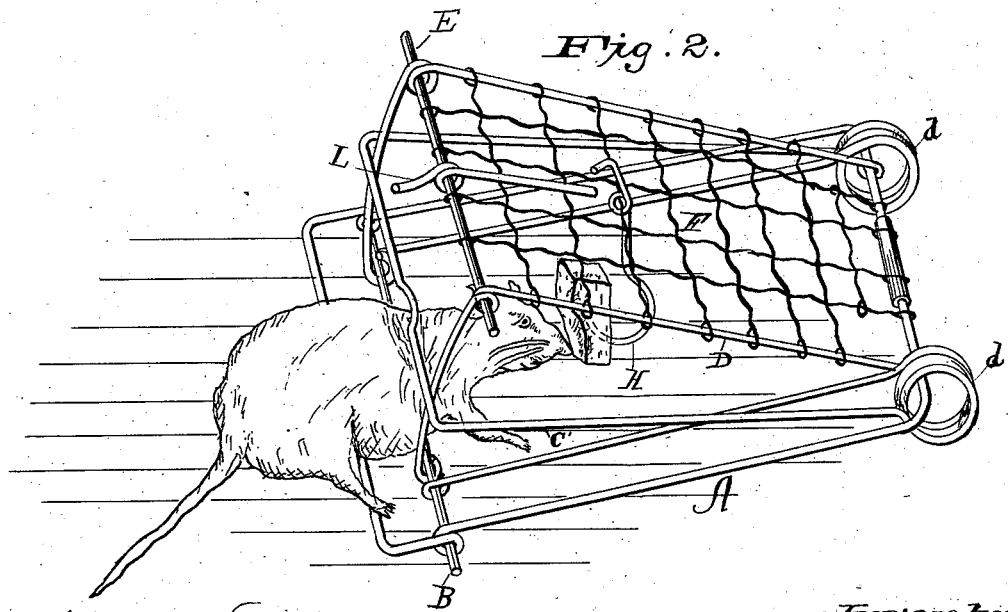
Figure 3:
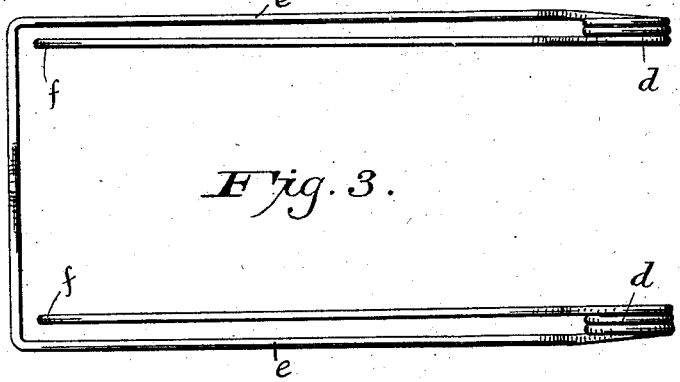
Figure 4:
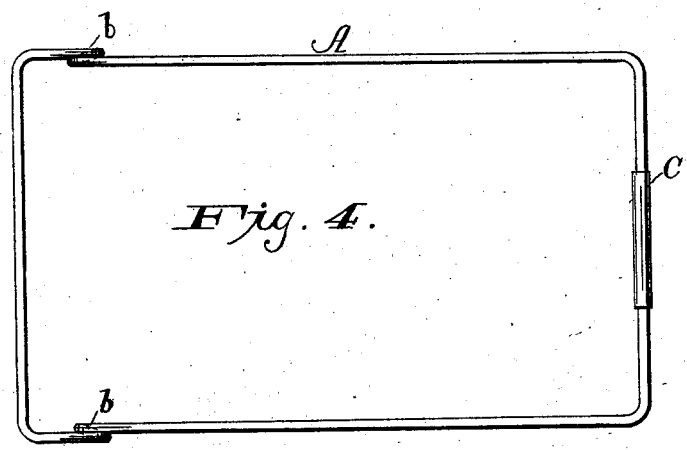
Figure 5:
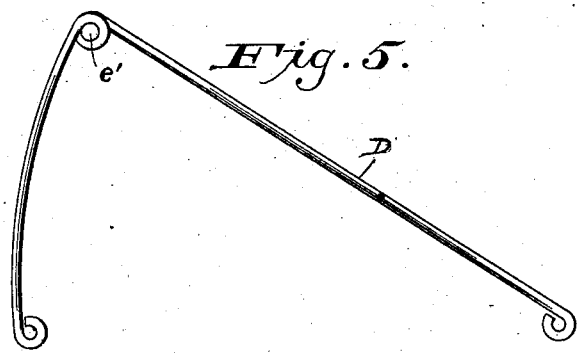

In the accompanying drawings, Figure 1 is a perspective view of the improved trap set for the animal. Fig. 2 is a similar perspective view, showing the trap sprung upon an animal. Fig. 3 is a plan view of the spring striking-arm. Fig. 4 is a plan view of the base-wire, and Fig. 5 is a side elevation of one of the side wires.

In the annexed figures, A represents the base-wire, preferably of rectangular shape. It is made of a single piece of wire bent into shape, looped on opposite sides to form eyes *b* near the front, and the ends inclosed in the short tube C, as shown. To the side eyes, *b*, of this frame is secured the straight rod B, for attachments hereinafter set forth.

C' is the spring striking-arm, likewise made of a single piece of wire. This is preferably bent into a rectangular-shaped frame, having the rear corners coiled one or more times, to form spring-coils *d*, to give spring-power to the front portion of the frame, and with the ends thereof bent inward, and carried forward parallel with the sides *e*, as shown in Fig. 3. The free ends of this frame are attached to the transverse rod B of the base-wire A by bending or looping the ends around the said rod; or they may be secured otherwise, and the coils *d* are passed over the end of the base-wire, as shown in Figs. 1 and 2 of the drawings.

D are the side arched pieces, each made of a single piece of wire, and formed about midway with the loop-eye *e'*, for the reception of the transverse rod E. The ends of these side pieces are attached to the transverse rod B and the rear cross-bar of the base-wire, respectively, by bending the ends as shown or otherwise. These side pieces may be made of one piece, the central portion of the wire being wrapped around the attached bar E. These side pieces, with the wire net-work F, constitute the inclined roof of the trap. To one of the roof transverse wires is suspended, within the boundaries of the trap, the pivotal bait-hook H, to engage with the rear end of the trigger or trip-lever L, pivotally attached to the transverse bar E.

The trap being thus constructed and organized as shown and described, the operation may be briefly stated as follows: The hook being properly baited, the spring-operated striking-arm is raised and sustained in the elevated position by means of the trip-lever and bait-hook, which set the trap for the animal to be caught, substantially as seen in Fig. 1 of the drawings. The trap is released from either the front or the sides by the animal pulling or moving the bait and its hook, which disturbance causes the upper end of the bait-hook to be shifted or thrown from the end of the trip-lever, and when thus released the striking-arm descends suddenly with great force and catches the animal between the lower bars of the base-frame and the striking-arm. As this striking-arm comes down with considerable force life is instantly knocked out of the animal, and as there is no floor or bottom to this trap the odor or blood from the animal will not be collected.

The free ends of spring striking-arm may be attached to the front bar of the base-wire A.

These traps can be made of all sizes, for large as well as small animals.

What I claim as my invention, and desire to secure by Letters Patent, is—

1. In an animal-trap, the combination of the base-wire, made of a single piece of wire, formed with the side looped eyes, and provided with the transverse rod B, the spring striking-arm, likewise made of a single piece of wire connected to the transverse rod B of the base-wire, and the side inclined pieces, D, having the eyes $e'$, and provided with the transverse rod E, and a rod or wire for suspending the bait-hook, substantially as described.

2. The animal-trap herein described, consisting of the combination of the base-wire, made of a single piece of wire, formed with the side looped eyes, and provided with the transverse rod B, with the spring striking-arm connected to the said base-wire at its front end, the inclined roof, the suspended bait-hook, and trigger, substantially as described.

In testimony whereof I affix my signature in presence of two witnesses.

JOHN L. SYMONDS.

Witnesses:
CLAUDE E. WILSON,
JNO. B. CORLISS.